(12) United States Patent
Kirmani et al.

(10) Patent No.: US 11,766,783 B2
(45) Date of Patent: Sep. 26, 2023

(54) OBJECT ASSOCIATION USING MACHINE LEARNING MODELS

(71) Applicant: Google LLC, Mountain View, CA (US)

(72) Inventors: Sean Kirmani, San Francisco, CA (US); Guy Satat, Sunnyvale, CA (US); Michael Quinlan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/817,076

(22) Filed: Aug. 3, 2022

(65) Prior Publication Data
US 2022/0388175 A1 Dec. 8, 2022

Related U.S. Application Data

(63) Continuation of application No. 16/717,896, filed on Dec. 17, 2019, now Pat. No. 11,440,196.

(51) Int. Cl.
*B25J 9/16* (2006.01)
*G06N 3/04* (2023.01)
*G06T 7/70* (2017.01)
*G06N 20/20* (2019.01)
*G06T 7/277* (2017.01)

(52) U.S. Cl.
CPC ............ *B25J 9/1697* (2013.01); *B25J 9/161* (2013.01); *G06N 3/04* (2013.01); *G06N 20/20* (2019.01); *G06T 7/277* (2017.01); *G06T 7/70* (2017.01)

(58) Field of Classification Search
None
See application file for complete search history.

(56) References Cited

U.S. PATENT DOCUMENTS 10,572,802 B1\* 2/2020 Sun .......................... G06N 7/01
10,739,733 B1 8/2020 Saxena et al.
(Continued)

OTHER PUBLICATIONS

L. Y. Ku, D. Ruiken, E. Learned-Miller and R. Grupen, "Error detection and surprise in stochastic robot actions," 2015 IEEE-RAS 15th International Conference on Humanoid Robots (Humanoids), Seoul, Korea (South), 2015, pp. 1096-1101, doi: 10.1109/HUMANOIDS.2015.7363505. (Year: 2015).\*

(Continued)

*Primary Examiner* — James A Thompson
(74) *Attorney, Agent, or Firm* — McDonnell Boehnen Hulbert & Berghoff LLP

(57) ABSTRACT

A method includes receiving sensor data representing a first object in an environment and generating, based on the sensor data, a first state vector that represents physical properties of the first object. The method also includes generating, by a first machine learning model and based on the first state vector and a second state vector that represents physical properties of a second object previously observed in the environment, a metric indicating a likelihood that the first object is the same as the second object. The method further includes determining, based on the metric, to update the second state vector and updating, by a second machine learning model configured to maintain the second state vector over time and based on the first state vector, the second state vector to incorporate into the second state vector information concerning physical properties of the second object as represented in the first state vector.

20 Claims, 9 Drawing Sheets

(56) References Cited

U.S. PATENT DOCUMENTS

| | | | |
|---|---|---|---|
| 10,766,136 | B1 | 9/2020 | Porter et al. |
| 11,440,196 | B1* | 9/2022 | Kirmani .................. B25J 9/161 |
| 2012/0265716 | A1* | 10/2012 | Hunzinger .......... G06F 18/2411 |
| | | | 706/12 |
| 2016/0096272 | A1 | 4/2016 | Smith et al. |
| 2018/0260234 | A1 | 9/2018 | Wagstaff et al. |
| 2019/0325265 | A1 | 10/2019 | Lecue et al. |
| 2020/0283016 | A1 | 9/2020 | Blaiotta |
| 2020/0285910 | A1 | 9/2020 | Steelberg et al. |
| 2021/0056365 | A1 | 2/2021 | Sivan et al. |
| 2021/0089890 | A1 | 3/2021 | Tang et al. |
| 2021/0094174 | A1 | 4/2021 | Romeres et al. |
| 2021/0150721 | A1 | 5/2021 | Yohanandan et al. |
| 2021/0158182 | A1 | 5/2021 | Duvvuri et al. |
| 2021/0164798 | A1 | 6/2021 | Timor et al. |
| 2021/0256366 | A1 | 8/2021 | Zhao et al. |
| 2021/0297852 | A1 | 9/2021 | Neubauer |
| 2022/0051031 | A1 | 2/2022 | Li et al. |

OTHER PUBLICATIONS

A. J. Valencia, F. Nadon and P. Payeur, "Toward Real-Time 3D Shape Tracking of Deformable Objects for Robotic Manipulation and Shape Control," 2019 IEEE Sensors, Montreal, QC, Canada, 2019, pp. 1-4, doi: 10.1109/SENSORS43011.2019.8956623. (Year: 2019).*

Mazzù et al., "A Cognitive Control-Inspired Approach to Object Tracking," IEEE Transactions on Image Processing, Jun. 2016, pp. 2697-2711, vol. 25, No. 6.

Vasquez et al., "Incremental Learning of Statistical Motion Patterns with Growing Hidden Markov Models," IEEE Transactions on Intelligent Transportation Systems, Sep. 2009, pp. 403-416, vol. 10, No. 3.

Zhu et al., "Object Tracking in Structured Environments for Video Surveillance Applications," IEEE Transactions on Circuits and Systems for Video Technology, Feb. 2010, pp. 223-235, vol. 20, No. 2.

* cited by examiner

OBJECT ASSOCIATION USING MACHINE LEARNING MODELS

CROSS-REFERENCE TO RELATED APPLICATIONS

This application is a continuation of and claims priority to U.S. patent application Ser. No. 16/717,896, filed Dec. 17, 2019, and titled "Object Association Using Machine Learning Models," which is hereby incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Machine learning models may be used to keep track of objects over time as the objects move in and out of the field of view of a sensor. Specifically, each object may be associated with a state vector that represents physical properties of the object. The state vector may be maintained and updated by a corresponding instance of an object state machine learning (ML) model assigned to the object. As additional sensor data regarding the object is received, a new state vector may be generated for the object. A comparator ML model may be configured to generate a metric indicating whether the new state vector and the initial state vector stored by the object state ML model assigned to the object each represent the same object. Specifically, the comparator ML model may, using the new state vector, disambiguate the object from other previously-seen objects. When the new and initial state vectors represent the same object, the object state ML model assigned to the object may use the new vector to update the initial state vector maintained thereby. This update may result in the updated state vector more accurately representing the physical properties of the object over time.

In a first example embodiment, a method is provided that includes receiving, from a sensor on a robotic device, sensor data representing a first object in an environment. The method also includes generating, based on the sensor data, a first state vector that represents physical properties of the first object. The method additionally includes generating, by a first ML model and based on (i) the first state vector and (ii) a second state vector that represents physical properties of a second object previously observed in the environment by the sensor, a metric indicating a likelihood that the first object is the same as the second object. The method further includes determining, based on the metric, to update the second state vector. The method yet further includes updating, by a second ML model configured to maintain the second state vector over time and based on the first state vector, the second state vector to incorporate into the second state vector information concerning physical properties of the second object as represented in the first state vector.

In a second example embodiment, a system is provided that includes a sensor configured to generate sensor data representing a first object in an environment. The system also includes a state vector generator communicatively connected to the sensor and configured to generate, based on the sensor data, a first state vector that represents physical properties of the object. The system additionally includes a first ML model communicatively connected to the state vector generator and configured to generate, based on (i) the first state vector and (ii) a second state vector that represents physical properties of a second object previously observed in the environment by the sensor, a metric indicating a likelihood that the first object is the same as the second object. The system further includes processing circuitry configured to determine, based on the metric, to update the second state vector. The system yet further includes a second ML model communicatively connected to the processing circuitry and configured to (i) maintain the second state vector over time and (ii) update, based on the first state vector, the second state vector to incorporate into the second state vector information concerning physical properties of the second object as represented in the first state vector.

In a third example embodiment, a non-transitory computer readable storage medium is provided having stored thereon instructions that, when executed by a computing device, cause the computing device to perform operations. The operations include receiving, from a sensor, sensor data representing a first object in an environment. The operations also include generating, based on the sensor data, a first state vector that represents physical properties of the object. The operations additionally include generating, by a first ML model and based on (i) the first state vector and (ii) a second state vector that represents physical properties of a second object previously observed in the environment by the sensor, a metric indicating a likelihood that the first object is the same as the second object. The operations further include determining, based on the metric, to update the second state vector. The operations yet further include updating, by a second ML model configured to maintain the second state vector over time and based on the first state vector, the second state vector to incorporate into the second state vector information concerning physical properties of the second object as represented in the first state vector.

In a fourth example embodiment, a system is provided that includes means for receiving, from a sensor on a robotic device, sensor data representing a first object in an environment. The system also includes means for generating, based on the sensor data, a first state vector that represents physical properties of the first object. The system additionally includes means for generating, based on (i) the first state vector and (ii) a second state vector that represents physical properties of a second object previously observed in the environment by the sensor, a metric indicating a likelihood that the first object is the same as the second object. The system further includes means for determining, based on the metric, to update the second state vector. The system yet further includes means for updating, by an ML model configured to maintain the second state vector over time and based on the first state vector, the second state vector to incorporate into the second state vector information concerning physical properties of the second object as represented in the first state vector.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
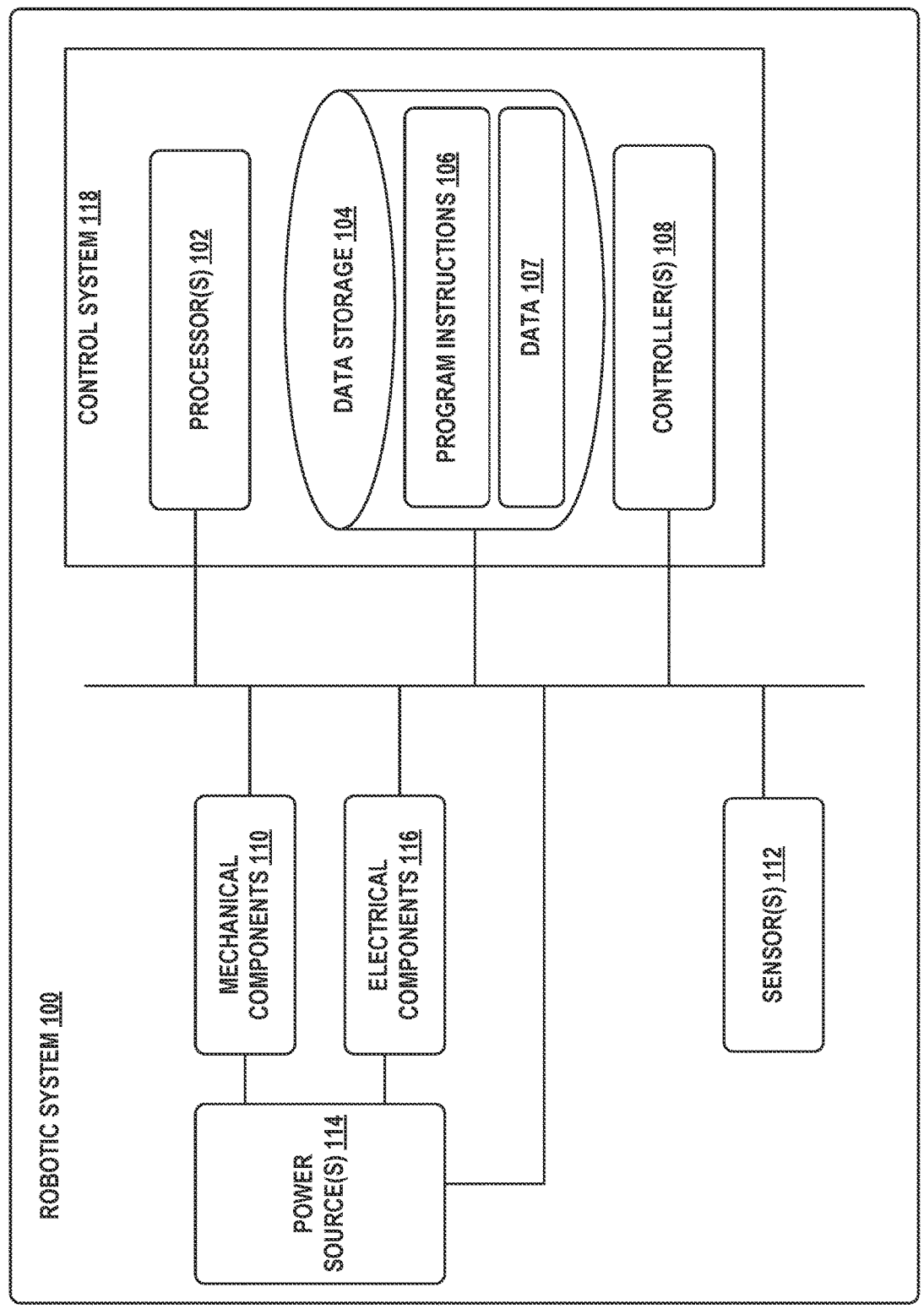
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

The use of robotic devices in various settings and applications is becoming increasingly prevalent. In many of these settings and applications, the objects and other contents of the environment may change over time. For example, the objects may be repositioned by the robot and/or other actors operating in the environments. In some cases, such repositioning may take place while the objects are outside of the field of view of the robot (e.g., when done by an actor other than the robot). Accordingly, it may be desirable for a robot to be able to keep track of the objects in the environment even as these objects are repositioned and/or as they move in and out of the field of view of sensors on the robot. For example, when the robot is tasked with bringing to a user a specific cup that the user previously used, it may be desirable that the robot maintain some representation of that specific cup so that it may find and bring to the user that specific cup, rather than some other beverage container.

Accordingly, provided herein is a system for maintaining and updating over time a state vector that represents the physical properties of a particular object within the environment. The state vector may be generated based on sensor data acquired from one or more sensors on the robot. The state vector may include a plurality of values, each of which represents a corresponding physical property of the corresponding object. For example, the state vector may contain information regarding object position within the environment, object size, a classification of the object, a first embedding representing the geometric properties of the object (e.g., three-dimensional shape), a second embedding representing visual properties of the object (e.g., patterns on surfaces of the object), distance between the object and the robot or sensor, confidence in how well the state vector represents the physical properties of the object, an indication of whether the object is present within a current field of view of one or more sensors on the robot, a weight of the object, and/or a time at which the object was last observed by the sensor, among other physical properties.

The state vector may be generated, maintained, and updated by the coordinated operation of a state vector generator and two machine learning (ML) models. When an object is represented by sensor data, the state vector generator may be configured to generate a corresponding state vector for that object. Thus, the state vector generator may be implemented as a collection of algorithms and models configured to measure, based on the sensor data, each of the physical properties represented by the state vector.

The two machine learning models may include a first ML model, which may be referred to as a comparator ML model, and a second ML model, which may be referred to as an object state ML model. The object state ML model may be configured to maintain and update the state vector of a particular object. Thus, each distinct object detected within the environment may be assigned a corresponding instance of the object state ML model. For example, each of two different cups present within the environment may be assigned a corresponding object state ML model configured to maintain and update the respective state vector thereof.

In some implementations, the object state ML model may be specific to a type of object. Thus, an object of a first type may be assigned a respective instance of a first type of object state ML model, and an object of a second type different from the first type may be assigned a respective instance of a second type of object state ML model. Such implementations may allow each type of object state ML model to be trained to more accurately represent the physical features of objects of the corresponding type. In other implementations, the object state ML model may be independent of object type.

When an object is first observed within the environment, the state vector generator may be used to generate an initial state vector therefor, and an instance of the object state ML model may be deployed to store that state vector. After some time, the robot may maintain a plurality of object state ML models to store the corresponding state vectors of the objects the robot has encountered in the environment. As new sensor data is received, new state vectors may be generated for any objects represented by the new sensor data. Some of these new state vectors may correspond to objects that the robot has not previously seen, while other may correspond to objects that the robot has already seen and for which a corresponding object state ML model maintains a corresponding state vector. The task of distinguishing between new objects and previously-seen objects may be performed by the comparator ML model.

Specifically, when a new state vector is generated for an object represented by the sensor data, the comparator ML model may compare the new state vector to a plurality of state vectors of previously-seen objects. The comparator ML model may compare the new state vector to the state vector of every previously-seen object or a subset thereof (e.g., the 10 previously-seen objects most likely to be the same as the object represented by the new state vector). For each comparison, the comparator ML model may generate a probability, confidence, or other metric indicating a likelihood that the two compared state vectors represent the same object.

Based on these probabilities, the robot may select a state vector of a previously-seen object that is most likely the same as the object represented by the new state vector. In one example, when this likelihood exceeds a threshold value (e.g., a fixed threshold value or a dynamic threshold value that depends on, for example, the context in which the robot is operating), the new state vector may be used to update the selected state vector. Additionally or alternatively, the new state vector may be used to update the selected state vector when the selected state vector is a nearest neighbor (or one of n-nearest neighbors) of the new state vector, as determined by a nearest neighbor search executed over the vector space defined by the state vectors.

That is, rather than initiating a new state vector for this object, the robot may incorporate into the selected state vector information regarding physical properties of the object that are represented in the new state vector but that might not yet be represented in the selected state vector. Accordingly, the informational content of the selected state vector may increase as the corresponding object is observed over time and/or from different points of view. On the other hand, when the likelihood of the two state vectors representing the same object does not exceed the threshold value, the new state vector may be determined to represent a new object, and a new object state ML model may be deployed to maintain the state vector thereof.

Such a system may allow the robot to recognize a given object even after the object has left a field of view of a sensor on the robot. Specifically, because the state vector represents a plurality of physical properties of the object, the robot may recognize the object as one for which it already maintains a state vector even if the object is moved while the robot is not observing the object. This may be the case even when the object is viewed from a different point of view upon reentering the field of view of the robot. Further, the system also allows the robot to remember the last known position of the object, and to distinguish between two objects that are positioned in physical proximity to one another and/or have a similar general appearance.

Notably, information about the object may be represented by the state vector without storing the raw sensor data that represents the object. In fact, while the accuracy of the state vector's representation of the physical properties of the object may increase over time as additional sensor data is received, the size of the state vector remains constant. In some implementations, the object state ML models and the comparator ML model may be trained using loss functions that interrelate outputs of these networks. For example, these loss functions may be similar to the loss functions utilized in the context of generative adversarial networks (GANs). Specifically, the training process may utilize a loss function that encourages the object state ML model to update the state vectors in a way that enables the comparator ML model to more accurately determine whether two state vectors represent the same object or two different objects.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
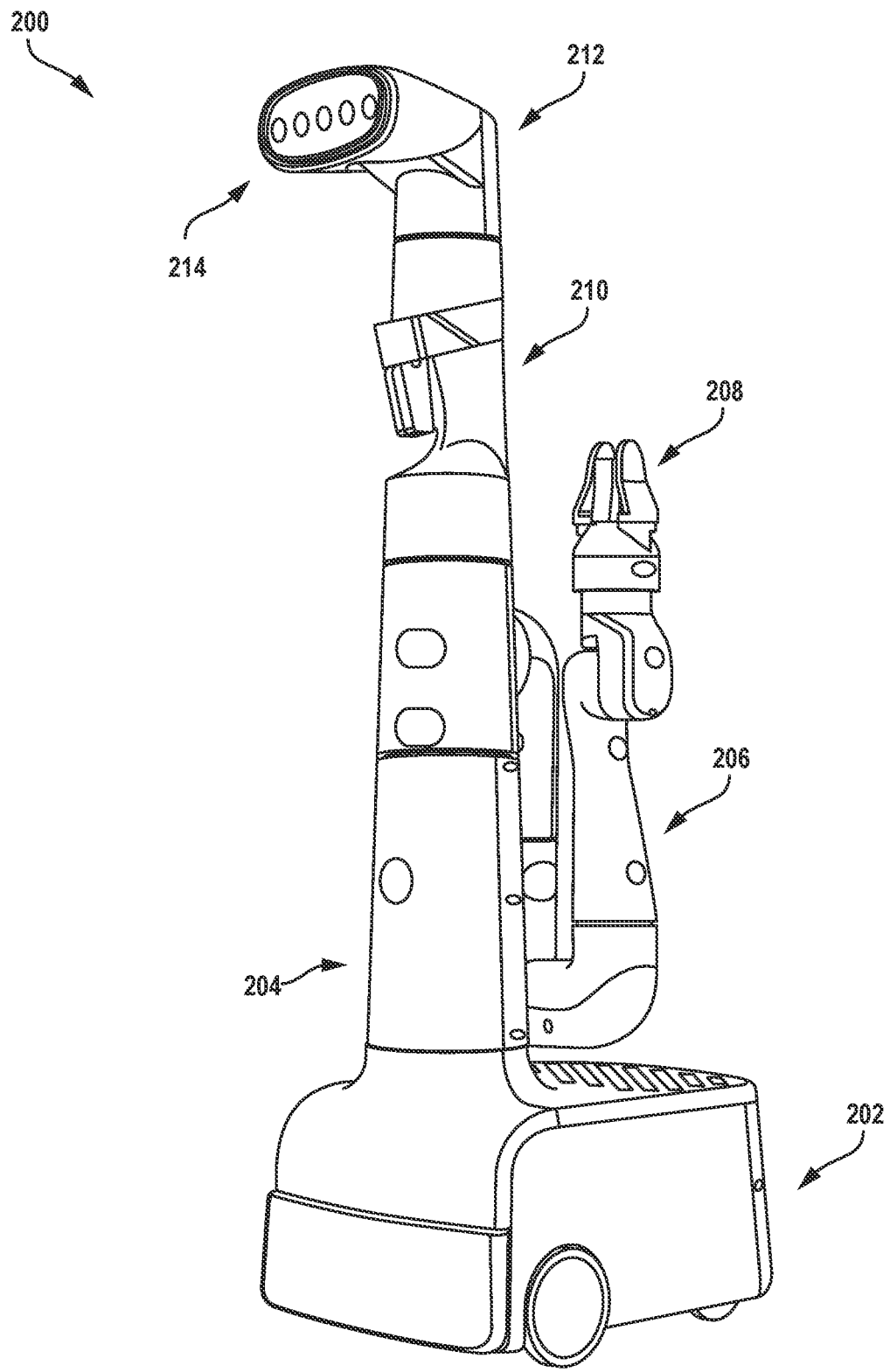
FIG. 2 illustrates a mobile robot, in accordance with example embodiments.
Figure 3:
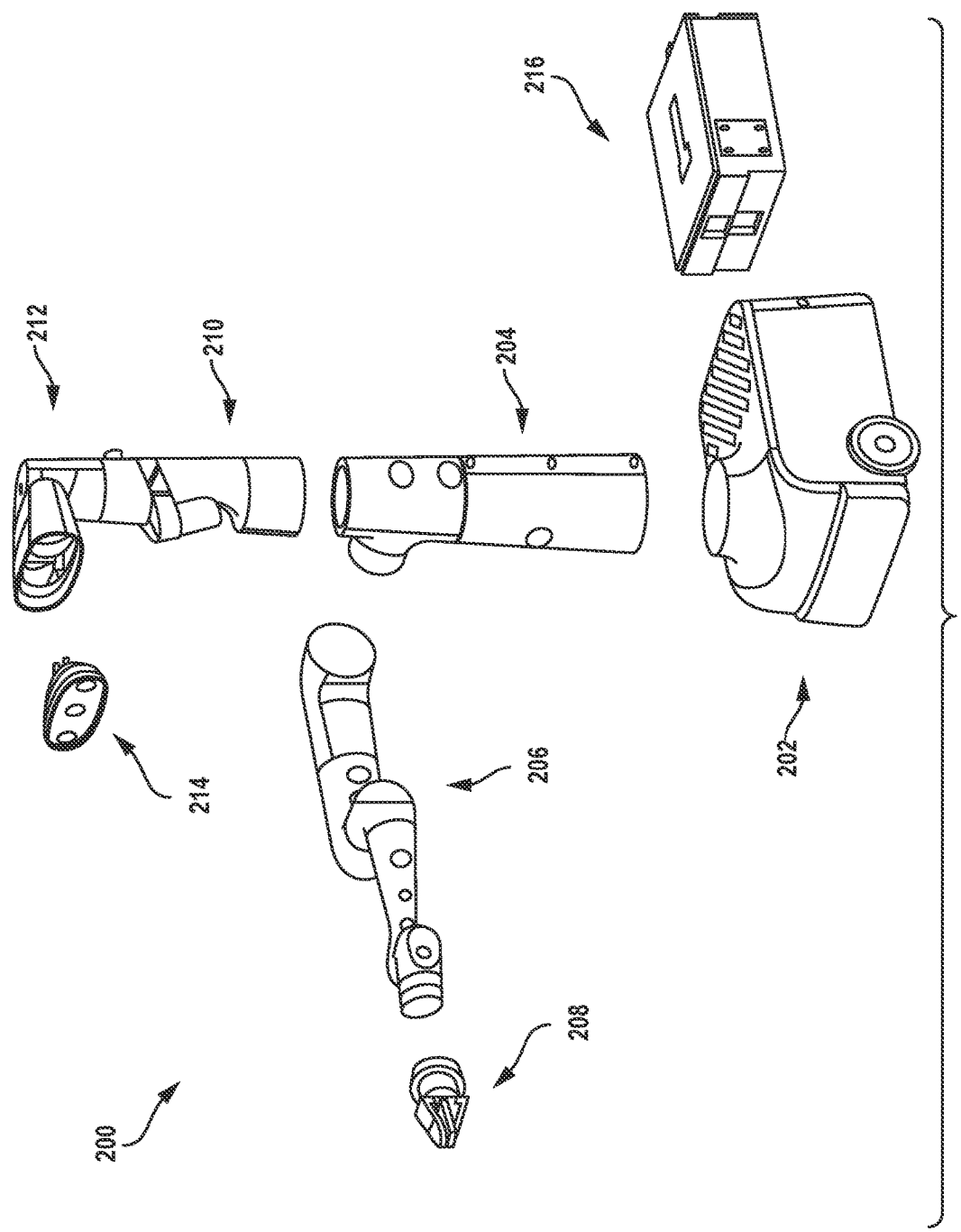
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, robot 200 may include mobile base 202, midsection 204, arm 206, end-of-arm system (EOAS) 208, mast 210, perception housing 212, and perception suite 214. Robot 200 may also include compute box 216 stored within mobile base 202.

Mobile base 202 includes two drive wheels positioned at a front end of robot 200 in order to provide locomotion to robot 200. Mobile base 202 also includes additional casters (not shown) to facilitate motion of mobile base 202 over a ground surface. Mobile base 202 may have a modular architecture that allows compute box 216 to be easily removed. Compute box 216 may serve as a removable control system for robot 200 (rather than a mechanically integrated control system). After removing external shells, compute box 216 can be easily removed and/or replaced. Mobile base 202 may also be designed to allow for additional modularity. For example, mobile base 202 may also be designed so that a power system, a battery, and/or external bumpers can all be easily removed and/or replaced.

Midsection 204 may be attached to mobile base 202 at a front end of mobile base 202. Midsection 204 includes a mounting column which is fixed to mobile base 202. Midsection 204 additionally includes a rotational joint for arm 206. More specifically, Midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide arm 206 with sufficient height to perform manipulation tasks at commonly encountered height levels (e.g., coffee table top and/or counter top levels). The length of the mounting column of midsection 204 may also allow the shoulder pitch J1 joint to rotate arm 206 over mobile base 202 without contacting mobile base 202.

Arm 206 may be a 7DOF robotic arm when connected to midsection 204. As noted, the first two DOFs of arm 206 may be included in midsection 204. The remaining five DOFs may be included in a standalone section of arm 206 as illustrated in FIGS. 2 and 3. Arm 206 may be made up of plastic monolithic link structures. Inside arm 206 may be housed standalone actuator modules, local motor drivers, and thru bore cabling.

EOAS 208 may be an end effector at the end of arm 206. EOAS 208 may allow robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

Mast 210 may be a relatively long, narrow component between the shoulder yaw J0 joint for arm 206 and perception housing 212. Mast 210 may be part of the stacked tower at the front of mobile base 202. Mast 210 may be fixed relative to mobile base 202. Mast 210 may be coaxial with midsection 204. The length of mast 210 may facilitate perception by perception suite 214 of objects being manipulated by EOAS 208. Mast 210 may have a length such that when the shoulder pitch J1 joint is rotated vertical up, a topmost point of a bicep of arm 206 is approximately aligned with a top of mast 210. The length of mast 210 may then be sufficient to prevent a collision between perception housing 212 and arm 206 when the shoulder pitch J1 joint is rotated vertical up.

As shown in FIGS. 2 and 3, mast 210 may include a 3D lidar sensor configured to collect depth information about the environment. The 3D lidar sensor may be coupled to a carved-out portion of mast 210 and fixed at a downward angle. The lidar position may be optimized for localization, navigation, and for front cliff detection.

Perception housing 212 may include at least one sensor making up perception suite 214. Perception housing 212 may be connected to a pan/tilt control to allow for reorienting of perception housing 212 (e.g., to view objects being manipulated by EOAS 208). Perception housing 212 may be a part of the stacked tower fixed to mobile base 202. A rear portion of perception housing 212 may be coaxial with mast 210.

Perception suite 214 may include a suite of sensors configured to collect sensor data representative of the environment of robot 200. Perception suite 214 may include an infrared(IR)-assisted stereo depth sensor. Perception suite 214 may additionally include a wide-angled red-green-blue (RGB) camera for human-robot interaction and context information. Perception suite 214 may additionally include a high resolution RGB camera for object classification. A face light ring surrounding perception suite 214 may also be included for improved human-robot interaction and scene illumination. In some examples, perception suite 214 may also include a projector configured to project images and/or video into the environment.

Figure 4:
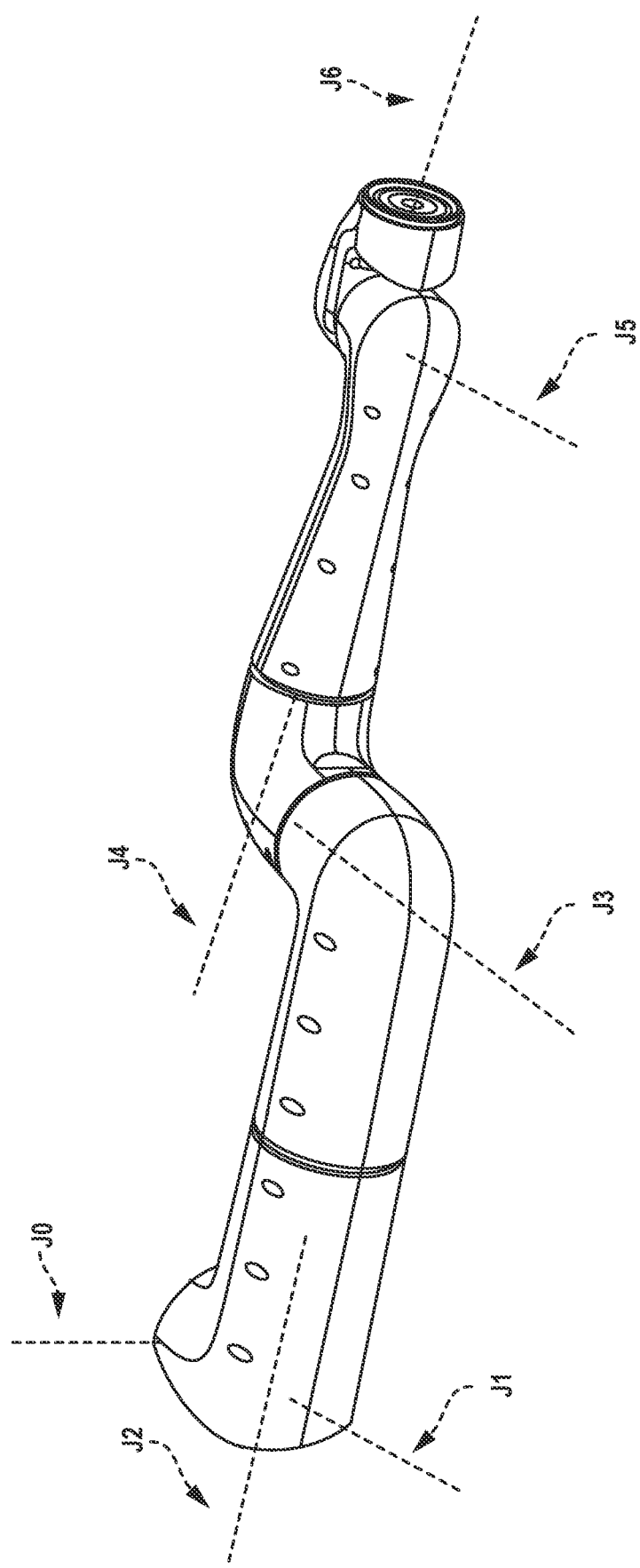
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

III. Example Object Association Systems and Models

Figure 5:
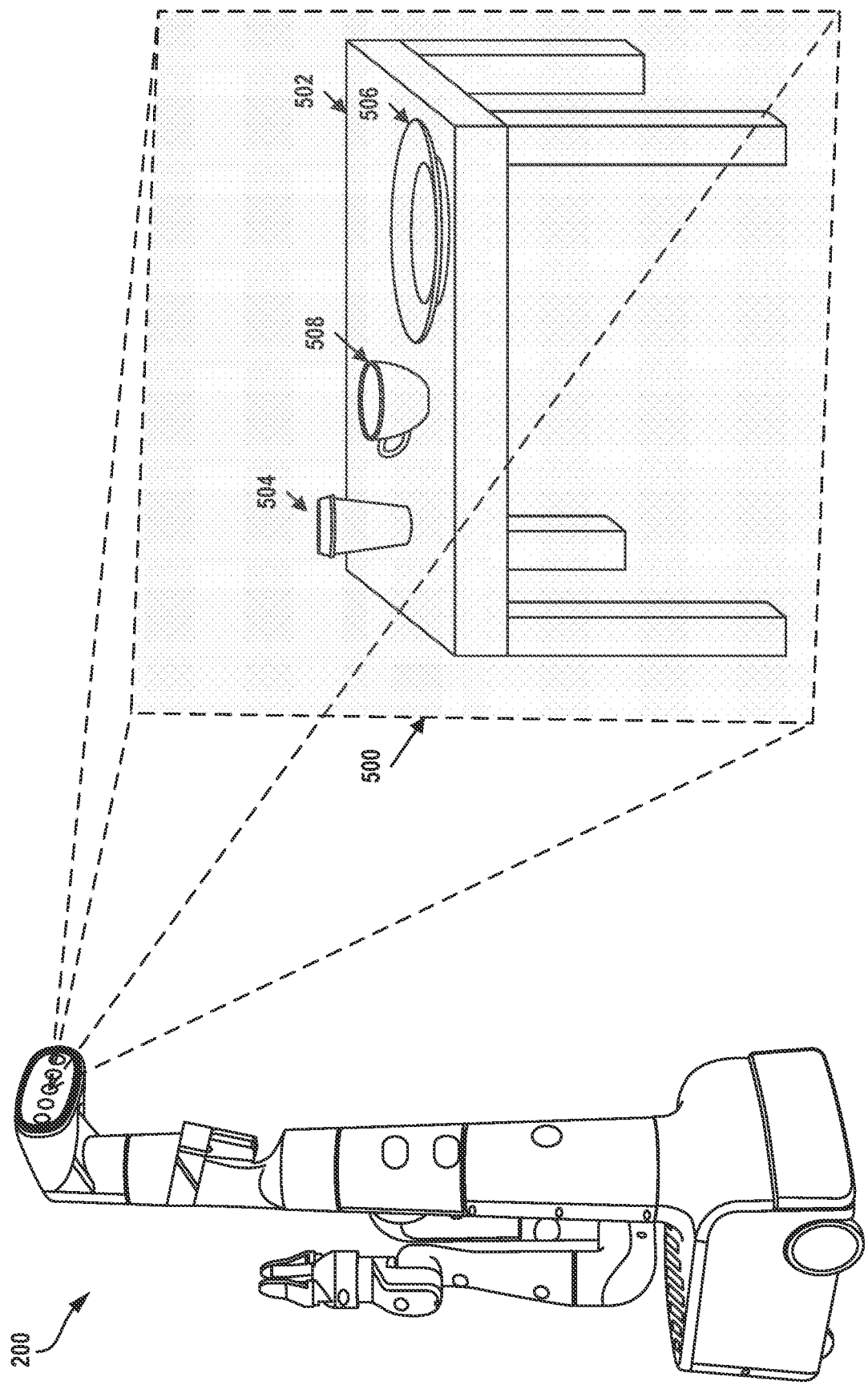
FIG. 5 illustrates a robot capturing sensor data, in accordance with example embodiments.

FIG. 5 illustrates robot 200 capturing sensor data that represents a plurality of objects present within field of view 500. Specifically, the sensor data represents table 502, cup 504, plate 506, and mug 508. The sensor data may be captured by one or more sensors within perception suite 214, and may include two-dimensional (2D) images (e.g., RGB-only images or grayscale images) and/or three-dimensional (3D) sensor data, among other types of sensor data. The pose of robot 200 and/or perception suite 214 may be adjusted over time to capture sensor data representing different portions of the environment and/or representing the same portion of the environment from different perspectives. Thus, as robot 200 moves throughout the environment, objects 502-508 may move in and out of field of view 500.

Figure 6:
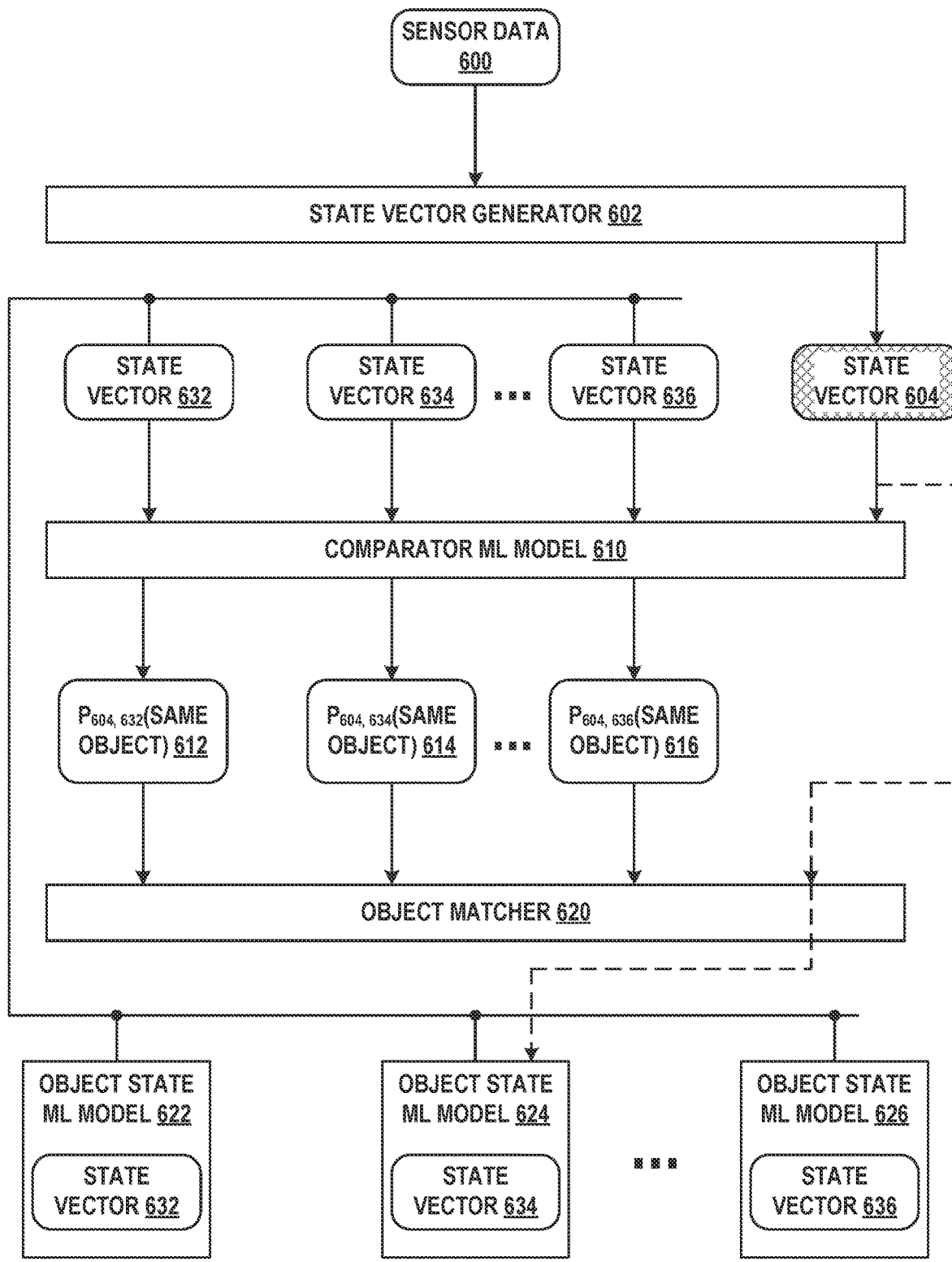
FIG. 6 illustrates a system, in accordance with example embodiments.

Based on the captured sensor data, a control system of robot 200 (e.g., control system 118) may be configured to initiate, maintain, and update representations of the respective states of objects 502-508 present within the environment of robot 200. To that end, FIG. 6 illustrates an example system that may be used to manage the representations of the respective states. Specifically, the system illustrated in FIG. 6 includes state vector generator 602, comparator ML model 610, object matcher 620, and object state ML models 622-626 (i.e., object state ML model 622 and object state ML models 624 through object state ML model 626). Each of these may be implemented as software executable by a processor circuitry and/or as purpose-built hardware components (e.g., an application-specific integrated circuits (ASICs)).

State vector generator 602 may be configured to receive as input sensor data 600 that represents the physical properties/characteristics of at least one object present within the environment of robot 200. For example, sensor data 600 may represent cup 504, as illustrated in FIG. 5. Additionally or alternatively, sensor data 600 may represent table 502, plate 506, and/or mug 508. State vector generator may also be configured to generate, based on sensor data 600, state vector 604 that represents the physical properties of a corresponding object (e.g., cup 504). When multiple objects are represented within sensor data 600, a different state vector may be generated for each object. State vector 604 may be a vector that includes a plurality of values. Each value of the plurality of values may represent a corresponding physical property of the object. Examples of these physical properties are discussed in more detail with respect to FIG. 7.

Each of object state ML models 622-626 may maintain a respective state vector that represents the physical properties of a corresponding object previously seen within the environment. Specifically, object state ML model 622 may maintain state vector 632, object state ML model 624 may maintain state vector 634, and object state ML model 626 may maintain state vector 636. For example, state vector 632 may correspond to mug 508, state vector 634 may correspond to cup 504, and state vector 636 may correspond to plate 506. Accordingly, object state ML model 622 may be associated with or assigned to mug 508, object state ML model 624 may be associated with or assigned to cup 504, and object state ML model 626 may be associated with or assigned to plate 506.

When sensor data regarding a particular object is received for the first time, a corresponding object state ML model may be initiated and used to store the state vector generated for the particular object. When additional sensor data regarding the particular object is received, the corresponding object state ML model may be used to update the state vector stored by the ML model. Thus, each of state vectors 632-636 may store the information acquired over time about a corresponding object.

When state vector 604 is generated to represent the physical properties of a particular object (e.g., cup 504), it might not be known if state vector 604 represents a previously-seen object or if the object represented by state vector 604 is being seen for the first time. Further, when state vector 604 represents a previously-seen object, it might not be known which of the previously seen objects, as represented by state vectors 632-636, state vector 604 corresponds to. The task of determining whether the object represented by state vector 604 has been previously seen and, if so, which of the previously seen object it corresponds to is handled by comparator ML model 610 and object matcher 620.

Specifically, comparator ML model 610 may be configured to compare state vector 604 to each of state vectors 632-636. That is, comparator model 610 may first receive as input state vector 604 and 632, then state vector 604 and 634, and so on until each of state vectors 632-636 is individually compared to state vector 604. Accordingly, comparator ML model 610 may be implemented as a neural network or another machine learning-based classifier.

Comparator ML model 610 may also be configured to generate, for each respective pair of (i) state vector 604 and (i) a respective state vector of state vectors 632-636, a probability, confidence, or other metric of a likelihood that the respective pair of state vectors represents the same object. For example, comparator ML model 610 may be configured to generate $P_{604, 632}$(Same Object) 612 indicating the probability that state vector 604 and state vector 632 represent the same object, $P_{604, 634}$(Same Object) 614 indicating the probability that state vector 604 and state vector 634 represent the same object, and $P_{604, 636}$(Same Object) 616 indicating the probability that state vector 604 and state vector 636 represent the same object.

Each of probabilities 612 and 614 through 616 (i.e., probabilities 612-616) may be provided as input to object matcher 620. Object matcher 620 may be configured to select, from state vectors 632-636, the state vector associated with a highest likelihood of representing the same object as state vector 604. Further, depending on the value of the likelihood that selected state vector represents the same object as state vector 604, object matcher 620 may be configured to either provide state vector 604 as input to a corresponding one of object state ML models 622-626 or initiate a new object state ML model.

For example, when probability 614 has the highest value out of probabilities 612-616, state vector 634 may be selected as most likely representing the same object as state vector 604. If the value of probability 614 exceeds a threshold value (i.e., comparator ML model 610 is sufficiently confident that the two objects are the same), object matcher 620 may be configured to provide state vector 604, which may represent the most-recently observed physical characteristics of, for example, cup 504, as input to object state ML model 624, which may maintain state vector 634 corresponding to cup 504. This scenario is illustrated in FIG. 6.

On the other hand, if the value of probability 614 does not exceed the threshold value (i.e., comparator ML model 610 is not sufficiently confident that the two objects are the same), object matcher 620 may instead be configured to initiate a new object state ML model to maintain and update state vector 604. In some implementations, the object state ML model initiated for a particular object may depend on a type or class of the object. For example, when the object is a piece of furniture, the initiated object state ML model may be an instance of a type of object state ML model that has been trained based on furniture-specific training data.

Accordingly, comparator 610 may be trained and the threshold value may be set such that (i) when state vector 604 represents an object for which one of object state ML models 622-626 already maintains a corresponding state vector, state vector 604 is used to update the corresponding state vector and (ii) when state vector 604 represents an object for which none of object state ML models 622-626 maintain a corresponding state vector, state vector 604 is instead used to initialize a new object state ML model that will maintain state vector 604. That is, comparator model 610 may be trained to accurately discriminate between new objects and previously-seen objects.

Each of object state ML models 622-626 may be configured to update the corresponding state vector of state vectors 632-636 as new information about the corresponding object becomes available. For example, when state vectors 604 and 634 each correspond to cup 504, state vector 634 may contain information about cup 504 extracted from prior observations of cup 504, while state vector 604 may contain information about cup 504 extracted from a most-recent observation of cup 504. Object state ML model 624 may be configured to receive as input state vector 604 and update state vector 634 to incorporate into state vector 634 information about cup 504 as represented by state vector 604. That is, object state ML model 624 may be configured to increase the informational content of state vector 634 over time. Thus, as cup 504 is observed over time from different points of view, state vector 634 may more completely and accurately represent the physical properties of cup 504.

Further, the system illustrated in FIG. 6 allows robot 200 to maintain a memory of the objects it has seen. Thus, when cup 504 is first observed, a representation of its physical properties may be stored in the form of state vector 634. Cup 504 may subsequently move outside of the view of view of sensors of robot 200 as robot 200 moves around the environment. At a later time, when robot 200 again observed cup 504, this most-recent observation may be related back to state vector 634. Any new information contained in the most-recent observation may be incorporated into state vector 634.

Accordingly, robot 200 may be able to track objects over time as they move in and out of the field of view of sensors on the robots. Thus, robot 200 may act on such objects in a history-aware manner. For example, robot 200 may be asked by a user to place cup 504 on table 502. As part of this task, robot 200 may use the system of FIG. 6 to generate state vector 634 to represent physical properties of cup 504, as determined based on sensor data acquired during hand-over of cup 504 from the user to robot 200. The robot may subsequently perform other tasks that result in cup 504 being out of the field of view of sensors on robot 200. During this time, cup 504 may be repositioned (e.g., by another user). At a later time, robot 200 may be asked to retrieve cup 504 for the user. Since cup 504 has left the field of view of robot 200 and has been moved, location of cup 504 might not be an accurate way to identify cup 504.

The system of FIG. 6, however, may allow robot 200 to determine that a cup observed at a different location is the same as cup 504 (i.e., the two observations represent one and the same cup) based on a state vector generated from a scan of the environment. Further, now that the cup has been repositioned, the state vector for cup 504 generated based on this scan of the environment may include additional information regarding physical characteristics of cup 504. For example, a pattern or design present on a previously-unseen side of cup 504 may now be visible. Thus, object state ML model 624 may update state vector 634 to incorporate thereinto this new information.

When sensor data 600 represents therein multiple objects, state vector generator 602 may generate a corresponding state vector for each of these objects. Similarly, comparator ML model 610 may compare each of these state vectors to each of state vectors 632-636. Thus, when sensor data 600 represents K objects and M object state ML models store M state vectors of previously-seen objects, comparator ML model 610 may perform up to K×M comparisons. In some implementations, the comparison process may be sped up by comparing state vector 604 of each object represented in sensor data 600 to n state vectors of state vectors 632-636. The n state vectors may be state vectors that are closest to state vector 604, as defined, for example, based on a Euclidean distance between the vectors. The n state vectors may be determined by way of a nearest neighbor search executed over the state vector space.

In some cases, once a matching state vector of state vectors 632-636 is found for a state vector of a particular object represented in sensor data 600, the matching state vector might no longer be a candidate for comparison for any remaining objects represented in sensor data 600. That is, the system of FIG. 6 may operate with awareness of the fact that two different objects represented in sensor data 600 cannot both be the same as one of the objects represented by state vectors 632-636.

In some implementations, comparator ML model 610 and object state ML models 622-626 may be co-trained, for example, using a loss function that interrelates outputs of the two models. That is, object state ML models 622-626 may be trained to update the state vectors maintained thereby in a manner that facilitates the determination by comparator ML model 610 of whether two objects are the same or different. Specifically, these two ML models may be trained using a loss function configured to maximize a confidence of comparator ML model 610 when it correctly determines, based on a respective state vector maintained by one of object state ML models 622-626 and a training vector generated by state vector generator 602, whether the objects represented thereby are two different objects or the same object. Such a loss function may allow parameters of object state ML models 622-626 to be adjusted during training in a manner that improves the rate of correct predictions by comparator ML model 610.

The loss function may be, for example, a sigmoid cross entropy loss, such as $H((o_i, n_i), t_i, C) = t_i \log(C(o_i, n_i)) - (1 - t_i) \log(1 - C(o_i, n_i))$, where $o_f$ represents a state vector maintained and/or updated by the object state ML model, $n_i$ represents a state vector generated by state vector generator 602, $t_i$ indicates whether state vectors $o_i$ and $n_i$ represent the same object (e.g., $t_i$=1) or two different objects (e.g., $t_i$=0), and $C(o_i,n_i)$ represents the output of comparator ML model 610. Since $o_i$ represents the output of the object state ML model, the loss function gradient of the object state ML model may be computed in terms of parameters of comparator ML model 610, thus allowing parameters of the object state ML model to be adjusted in a way that improves or maximizes the accuracy of comparator ML model 610. Such training may be analogous to the training of GANs. For example, while the training here is cooperative, rather than adversarial, the loss function may be formulated and/or reformulated in a manner similar to loss functions employed with respect to GANs. Further, the ML models may take turns during the training process. For example, comparator ML model 610 may be trained for k iterations followed by n iterations of training of the object state ML model, and so on until satisfactory accuracy is reached.

In some implementations, robot 200 may include an object tracker configured to track the position of a given object. Such tracking may take place while the object is in and/or remains around the field of view of robot 200. The object tracker may employ a Kalman filter. Performance of the Kalman filter may be improved by using one or more of probabilities 612-616 and/or one or more of state vectors 632-636 to select the parameters or weights of the Kalman filter. For example, when a physical property of a tracked object measured by a sensor can be corroborated or verified using a state vector corresponding to the tracked object, a measurement-based estimate of the Kalman filter may be given additional weight relative to a model-based prediction of the Kalman filter.

IV. Example State Vectors

Figure 7:
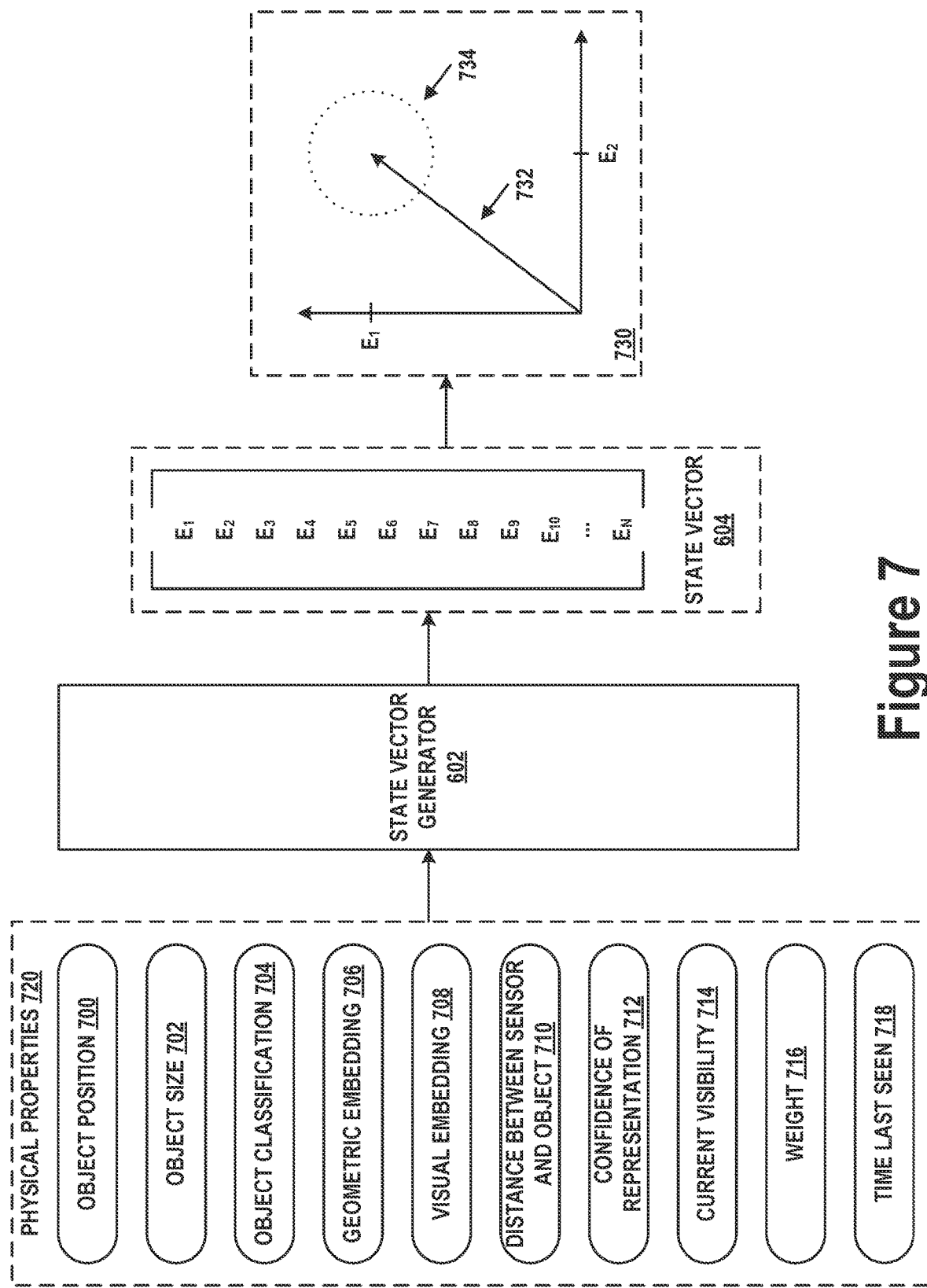
FIG. 7 illustrates a state vector, in accordance with example embodiments.

FIG. 7 illustrates additional details regarding state vector generator 602 and state vector 604. State vector 604 may include a plurality of values $E_1$-$E_N$ (i.e., $E_1$, $E_2$, $E_3$, $E_4$, $E_5$, $E_6$, $E_7$, $E_8$, $E_9$, and $E_{10}$ through $E_N$) that represent, in an N-dimensional vector space, physical properties 720 of a corresponding object represented by sensor data 600. Specifically, the physical properties may include object position 700, object size 702, object classification 704, geometric embedding 706, visual embedding 708, distance between sensor and object 710, confidence of representation 712, current visibility 714, weight 716, and/or time last seen 718. In some implementations, some of these physical properties might not be measured and/or represented in state vector 604, and/or other additional physical properties may be measured and/or represented in state vector 604.

State vector generator 602 may be configured to measure or otherwise quantify physical properties 720 based on sensor data 600 by way of one or more algorithms or models. Further, state vector generator 602 may implement a mapping from physical properties 720 to state vector 604. Thus, each of values $E_1$-$E_N$ may represent a value of a corresponding one of physical properties 700-718.

For example, object position 700 may be determined by way of one or more object detection and localization algorithms implemented by state vector generator 602, and may be represented by x, y, and z coordinates of the object within a map of the environment. The values of the x, y, and z coordinates may be represented by values $E_1$-$E_3$ of state vector 604. Similarly, object size 702 may be represented by a bounding box fitted around the object by way of, for example, an ML model implemented by state vector generator 602. The shape of the bounding box may be defined by one or more of values $E_4$-$E_N$. Object classification 704 may represent one of a number of predefined classes of objects, and may be determined by another ML model implemented by state vector generator 602.

Geometric embedding 706 may represent the three-dimensional shape of the object embedded in a first vector space, while visual embedding 708 may represent the surface characteristics of surfaces of the object embedded in a second vector space. Each of embedding 706 and 708 may be generated by a corresponding embedding model implemented by state vector generator 602. Distance between sensor and object 710 may be determined based on any depth information contained in sensor data 600. Confidence of representation 712 may be a quantity that is generated and updated by the object state ML model assigned to maintaining and updating the state vector of the object represented by state vector 604. Current visibility 714 may indicate whether the object is visible in the most-recently received sensor data. Weight 716 may indicate the weight of the object as measured, for example, based on an amount of force required to pick up the object. Time last seen 718 may indicate a time at which the object was last observed by a sensor (e.g., on robot 200).

Some of values $E_1$-$E_N$ may be human-interpretable, while others might not. That is, some of the values may provide explicit metrics of corresponding physical properties of the object (e.g., position 700, size 702). In other cases, some values $E_1$-$E_N$ might not be human interpretable (e.g., embeddings 706 and 708), but may nevertheless be interpretable by, for example, comparator ML model 610 to determine whether two objects are different or the same. Thus, while values $E_1$-$E_N$ might not themselves be human-interpretable, values $E_1$-$E_N$ may be combined, transformed, and/or otherwise processed by further models and/or algorithms to generate human-interpretable outputs (e.g., an indication that the objects are the same).

Values $E_1$-$E_N$ may be used to determine the similarity of the physical properties of two different objects. Namely, a distance between the corresponding state vectors in the N-dimensional space of the two different objects may be indicative of a similarity between the properties of the two different objects. For example, when the distance is small, the physical properties of the two objects may be more similar than when the distance is large. A subset of the values of the vectors may be graphed to illustrate the degree of similarity between the physical properties of the two different objects. To that end, FIG. 7 illustrates graph 730 of values $E_1$ and $E_2$ of state vector 604 plotted along the horizontal and vertical axis, respectively.

Other vectors falling within threshold 734 of graphical representation 732 of state vector 604 may be considered similar in that they represent objects that have similar physical properties. Notably, although graph 730 shows only two dimensions for simplicity of illustration, the concepts herein discussed may be expanded to N-dimensions. For example, in the case of three dimensions, threshold 734 may be represented graphically as a sphere rather than a circle. In one example, the distance between two vectors may be the Euclidean distance. In another example, the distance between the two vectors may be the cosine distance or another measure of distance. Thus, objects having similar physical properties may generate state vectors that, when embedded in the N-dimensional space defined by state vector generator 602, fall within a threshold distance of one another.

V. Example Object State ML Model Implementations

Figure 8:
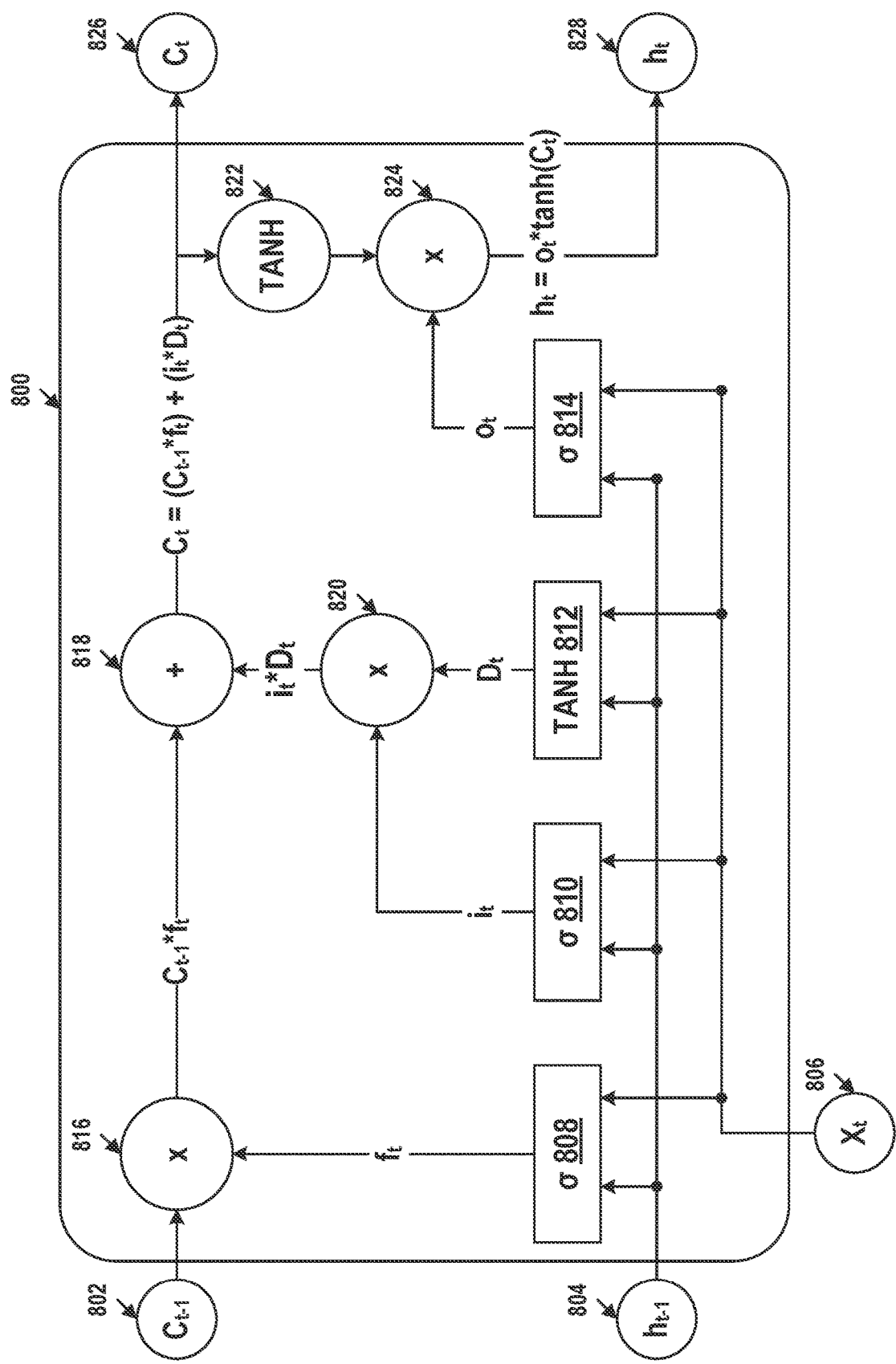
FIG. 8 illustrates a long short term memory neural network, in accordance with example embodiments.

FIG. 8 illustrates an example implementation of the object state ML model used by the system of FIG. 6. Specifically, FIG. 8 illustrates a long short term memory (LSTM) neural network 800. LSTM 800 may be configured to store and, over time, update a state vector of a corresponding object in the environment. Specifically, LSTM 800 may receive as input (i) the current state vector stored by LSTM 800 and (ii) a new state vector generated by state vector generator 602 based on sensor data representing the object. LSTM 800 may be configured to update the current state vector by discarding therefrom information that is no longer relevant and incorporating thereinto new information from the new state vector.

LSTM 800 includes forget gate 808, input gate 810, tan h gate 812, output gate 814, pointwise multipliers 816, 820, and 824, pointwise adder 818, and pointwise tan h 822. LSTM 800 receives as input previous cell state $C_{t-1}$ 802, previous hidden state $h_{t-1}$ 804, and current input $x_t$ 806. LSTM 800 generates as output current cell state $C_t$ 826 and current hidden state $h_t$ 828. Cell states $C_{t-1}$ 802 and $C_t$ 826 allow LSTM 800 to carry relevant information forward over time (i.e., maintain a memory). In the context of maintaining and updating state vectors by way of LSTM 800, previous hidden state $h_{t-1}$ 804 may represent an encoding of the current state vector maintained by LSTM 800, current input $x_t$ 806 may represent the state vector generated by state vector generator 602 based on the most recent sensor data, and current hidden state $h_t$ 828 may represent an encoding of the updated state vector.

Forget gate 808 may be configured to determine, based on previous hidden state $h_{t-1}$ 804 and current input $x_t$ 806, what portions of previous cell state $C_{t-1}$ 802 are to be kept and what portions are to be discarded. Specifically, forget gate 808 computes a vector $f_t = \sigma(W_f [h_{t-1}, x_t] + b_f)$, where σ represents the sigmoid function configured to scale its inputs between 0 (completely forget) and 1 (completely keep), $W_f$ represents a weight matrix of forget gate 808 by which the concatenation $[h_{t-1}, x_t]$ of prior hidden state 804 and current input 806 is to be multiplied, and $b_f$ represents a bias of forget gate 808. Thus, forget gate 808 may be viewed as an instance of a neural network within LSTM 800. The values of vector $f_t$ may be multiplied with previous cell state $C_{t-1}$ 802 in a pointwise manner by multiplier 816 to generate an intermediate result $C_{t-1}*f_t$.

Input gate 810 along with tan h gate 812 may be configured to determine what new information is going to be stored in current cell state Ct 826. Specifically, input gate 810 computes a vector $i_t = \sigma(W_i[h_{t-1}, x_t] + b_i)$, where σ represents the sigmoid function, $W_i$ represents a weight matrix of input gate 810 by which the concatenation $[h_{t-1}, x_t]$ of prior hidden state 804 and current input 806 is to be multiplied, and $b_i$ represents a bias of input gate 810. Similarly, tan h gate 812 computes a vector $D_t = \tan h(W_D[h_{t-1}, x_t] + b_D)$, where tan h represents the hyperbolic tangent function configured to scale its inputs between −1 and 1, $W_D$ represents a weight matrix of tan h gate 812 by which the concatenation $[h_{t-1}, x_t]$ of prior hidden state 804 and current input 806 is to be multiplied, and $b_D$ represents a bias of tan h gate 812.

Current cell state Ct 826 may be computed by performing the pointwise multiplication and addition of multiplier 820 and adder 818, respectively. Thus, current cell state 826 is $C_t = (C_{t-1}*f_t) + (i_t*D_t)$. Accordingly, input gate 810 may be viewed as determining what portions of previous cell state $C_{t-1}$ 802 will be updated while tan h gate 812 may be viewed computing, based on the current input 806, the values that will be used to perform any of these updates.

Output gate 814 may be configured to determine, based on previous hidden state $h_{t-1}$ 804 and current input $x_t$ 806, what portions of current cell state Ct 826 are to be propagated through as output. Specifically, output gate 814 computes a vector $o_t = \sigma(W_o[h_{t-1}, x_t] + b_o)$, where σ represents the sigmoid function, $W_o$ represents a weight matrix of output gate 814 by which the concatenation $[h_{t-1}, x_t]$ of prior hidden state 804 and current input 806 is to be multiplied, and $b_o$ represents a bias of output gate 814. The values of vector $o_t$ are multiplied with tan h of current cell state $C_t$ 826 in a pointwise manner by multiplier 824 to generate current hidden state 828 $h_t = o_t * \tan h(C_t)$.

Thus, LSTM 800 may be used to update state vector $V_{t-1}$ to form an updated state vector $V_t$. Notably, state vector $V_{t-1}$ may be equal to hidden state $h_{t-1}$, or may be generated by processing hidden state $h_{t-1}$ by one or more additional neural network layers or other algorithms. Similarly, the structure of LSTM 800 may be repeated to update state vector $V_t$ to form yet another updated state vector $V_{t+1}$, thus allowing an LSTM to be used to maintain the state vector of an object over time as new sensor data representing the object is acquired.

In some implementations, a different LSTM may be trained for each type or class of objects expected to be encountered within the environment. For example, the system may include a first LSTM specific to furniture, a second LSTM specific to liquid containers, a third LSTM specific to electronic devices, and so on. Each type of LSTM may be trained using training data that represents objects of the corresponding type. An instance of one of these types of LSTMs may be deployed to maintain the state of an object detected within sensor data based on a classification of the object.

In some implementations, object state ML models may alternatively or additionally be implemented as another type of ML model. For example, object state ML models may be implemented as recurrent neural networks (RNNs), a stack of feed-forward neural networks, a model configured to generate a coreset, or another type of neural network architecture that implements attention or an attention-like architecture capable of maintaining and updating the state vector over time. For example, a stack of feed-forward neural networks may be configured to receive as input the last k state vectors generated for a particular object by state vector generator 602 and, based thereon, generate an updated state vector.

VI. Additional Example Operations

Figure 9:
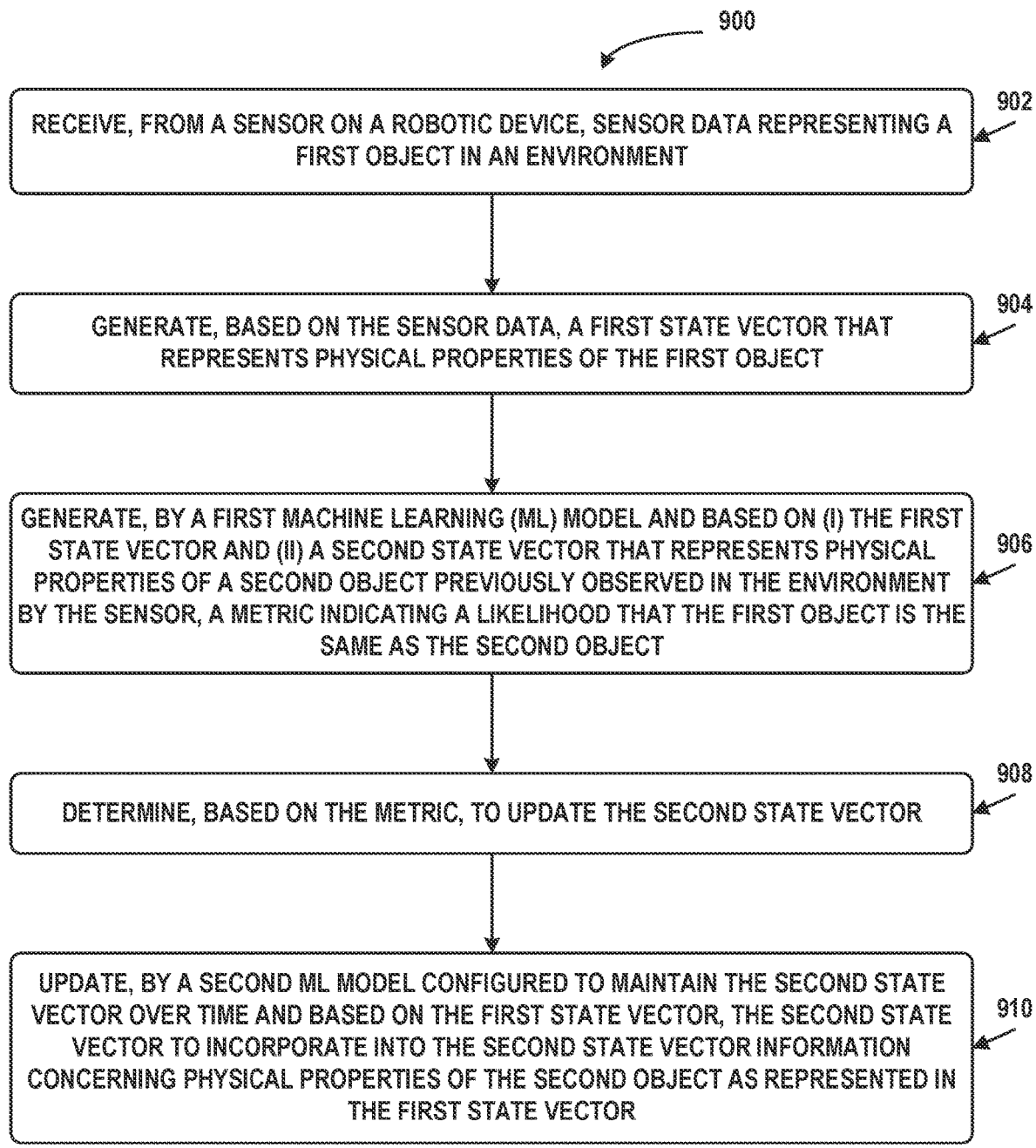
FIG. 9 illustrates a flow chart, in accordance with example embodiments.

FIG. 9 illustrates flow chart 900 of operations related to maintaining and updating information regarding a state of an object over time. The operations may be carried out by robotic system 100 and/or robot 200, among other possibilities. The embodiments of FIG. 9 may be simplified by the removal of any one or more of the features shown therein. Further, these embodiments may be combined with features, aspects, and/or implementations of any of the previous figures or otherwise described herein.

Block 902 involves receiving, from a sensor on a robotic device, sensor data representing a first object in an environment.

Block 904 involves generating, based on the sensor data, a first state vector that represents physical properties of the first object.

Block 906 involves generating, by a first ML model and based on (i) the first state vector and (ii) a second state vector that represents physical properties of a second object previously observed in the environment by the sensor, a metric indicating a likelihood that the first object is the same as the second object.

Block 908 involves determining, based on the metric, to update the second state vector.

Block 910 involves updating, by a second ML model configured to maintain the second state vector over time and based on the first state vector, the second state vector to incorporate into the second state vector information concerning physical properties of the second object as represented in the first state vector.

In some embodiments, determining to update the second state vector may include determining, based on the metric, that the likelihood exceeds a threshold value and, based on determining that the likelihood exceeds a threshold value, determining to update the second state vector.

In some embodiments, generating the metric indicating the likelihood that the first object is the same as the second object may include generating, for each respective object of a plurality of objects previously observed in the environment by the sensor, a respective metric indicating a likelihood that the first object is the same as the respective object. The respective metric may be generated by the first ML model based on (i) the first state vector and (ii) a respective state vector that represents physical properties of the respective object.

In some embodiments, determining to update the second state vector may include determining that the second object is associated with a highest likelihood of being the same as the first object based on the respective metric of each respective object of the plurality of objects previously observed in the environment. Based on determining that the second object is associated with the highest likelihood of being the same as the first object, it may be determined that the respective metric of the second object exceeds a threshold value. Based on determining that the respective metric of the second object exceeds the threshold value, the second ML model may be selected for updating the second state vector.

In some embodiments, the sensor data may additionally represent a third object in the environment. The third object may be different from the first object. Selecting of the second ML model may exclude the second object from being a candidate for comparison to the third object by the first ML model to determine a likelihood that the third object is the same as the second object.

In some embodiments, the plurality of objects previously observed in the environment by the sensor may include every object for which the robotic device stores a corresponding ML model that maintains a corresponding state vector over time.

In some embodiments, the plurality of objects previously observed in the environment by the sensor may include n objects associated with corresponding n state vectors that are nearest to the first state vector.

In some embodiments, additional sensor data representing a third object in the environment may be received from the sensor. A third state vector that represents physical properties of the third object may be generated based on the additional sensor data. For each respective object of a plurality of objects previously observed in the environment by the sensor, a respective metric may be generated that indicates a likelihood that the third object is the same as the respective object. The respective metric may be generated by the first ML model based on (i) the third state vector and (ii) a respective state vector that represents physical properties of the respective object. It may be determined that the respective metric of each respective object of the plurality of objects does not exceed a threshold value. Based on determining that the respective metric of each respective object of the plurality of objects does not exceed a threshold value, it may be determined that the third object is different from each respective object. Based on determining that the third object is different from each respective object, a third ML model may be initialized to maintain the third state vector over time.

In some embodiments, the second ML model may include an instance of a type of ML model that corresponds to a class of the second object.

In some embodiments, the second ML model may include a long short term memory neural network.

In some embodiments, the first state vector may include a plurality of values indicating one or more of: (i) a position of the first object within the environment, (ii) a size of the first object, (iii) a classification of the first object, (iv) an embedding representing the first object, (v) a time at which the first state vector was last updated, (vi) a distance between the sensor and the first object, (vii) a confidence with which the first state vector represents the physical properties of the first object, (viii) an indication of whether the first object is within a current field of view of the sensor, (ix) a weight of the first object, or (x) a time at which the first object was last observed by the sensor.

In some embodiments, the first ML model and the second ML model may be trained using a loss function that interrelates outputs of the first ML model and the second ML model and is configured to maximize a confidence of the first ML model when the first ML model correctly determines, based on a respective state vector maintained by the second ML model and a training state vector, whether the respective state vector and the training state vector represent two different objects or the same object.

In some embodiments, at least one of (i) the metric or (ii) the second state vector as updated may be used to select parameters of a Kalman filter used by an object tracker of the robotic device.

In some embodiments, the sensor data representing the first object may be acquired after the second object (i) has been observed by the sensor and (ii) has left a field of view of the sensor.

In some embodiments, it may be determined, based on the metric, that the likelihood exceeds a threshold value. Based on determining that the likelihood exceeds the threshold value, one or more operations may be determined for the robotic device to interact with the first object.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   receiving sensor data representing a first object in an environment;
   generating, based on the sensor data, a first state vector that represents physical properties of the first object;
   generating, for each respective object of a plurality of objects previously observed in the environment, a corresponding metric indicating a likelihood that the first object is the same as the respective object, wherein the corresponding metric is generated by a first machine learning (ML) model and based on (i) the first state vector and (ii) a respective state vector that represents physical properties of the respective object;
   determining, based on the corresponding metric of each respective object of the plurality of objects, that the first object is different from each respective object of the plurality of objects; and
   based on determining that the first object is different from each respective object of the plurality of objects, initializing a second ML model configured to represent the physical properties of the first object over time, wherein the second ML model is initialized based on the first state vector.

2. The computer-implemented method of claim 1, wherein the sensor data is received from a sensor on a robotic device.

3. The computer-implemented method of claim 1, wherein determining that the first object is different from each respective object of the plurality of objects comprises:
   determining that the corresponding metric of each respective object of the plurality of objects does not exceed a threshold value; and
   based on determining that the corresponding metric of each respective object of the plurality of objects does not exceed a threshold value, determining that the first object is different from each respective object of the plurality of objects.

4. The computer-implemented method of claim 1, wherein the plurality of objects previously observed in the environment comprises every object for which the robotic device stores a corresponding ML model that maintains a corresponding state vector over time.

5. The computer-implemented method of claim 1, wherein the plurality of objects previously observed in the environment comprises n objects associated with corresponding n state vectors that are nearest to the first state vector.

6. The computer-implemented method of claim 1, further comprising:
   receiving additional sensor data representing a second object in the environment;
   generating, based on the additional sensor data, a second state vector that represents physical properties of the second object;
   generating, by the first ML model and based on (i) the first state vector and (ii) the second state vector, an additional metric indicating a likelihood that the first object is the same as the second object;
   determining, based on the additional metric, to update the first state vector; and updating the first state vector by the second ML model based on the second state vector.

7. The computer-implemented method of claim 6, wherein determining to update the first state vector comprises:
   determining, based on the additional metric, that the second object as represented by the second state vector is the same as the first object represented by the first state vector; and
   based on determining that the second object as represented by the second state vector is the same as the first object represented by the first state vector, determining to update the second state vector.

8. The computer-implemented method of claim 7, wherein determining that the second object as represented by the second state vector is the same as the first object represented by the first state vector comprises one or more of:
   determining that the additional metric is a highest metric of a plurality of metrics generated by the first ML model based on (i) the second state vector and (ii) each of a plurality of other state vectors; or
   determining that the additional metric exceeds a threshold value.

9. The computer-implemented method of claim 1, wherein the second ML model comprises an instance of a class-specific type of ML model that corresponds to a class of the first object.

10. The computer-implemented method of claim 1, wherein the second ML model comprises a long short-term memory neural network.

11. The computer-implemented method of claim 1, wherein the first state vector comprises a plurality of values indicating one or more of: (i) a position of the first object within the environment, (ii) a size of the first object, (iii) a classification of the first object, (iv) an embedding representing the first object, (v) a time at which the first state vector was last updated, (vi) a distance between the sensor and the first object, (vii) a confidence with which the first state vector represents the physical properties of the first object, (viii) an indication of whether the first object is within a current field of view of the sensor, (ix) a weight of the first object, or (x) a time at which the first object was last observed by the sensor.

12. The computer-implemented method of claim 1, wherein the first ML model and the second ML model are trained using a loss function that interrelates outputs of the first ML model and the second ML model and is configured to maximize a confidence of the first ML model when the first ML model correctly determines, based on a respective state vector maintained by the second ML model and a training state vector, whether the respective state vector and the training state vector represent two different objects or the same object.

13. The computer-implemented method of claim 1, wherein at least one of (i) the corresponding metric or (ii) the first state vector is used to select parameters of a Kalman filter used by an object tracker of the robotic device.

14. The method of claim 1, further comprising:
   determining, based on the first state vector, one or more operations for the robotic device to perform to interact with the first object.

15. A system comprising:
   a processor; and
   a non-transitory computer-readable storage medium having stored thereon instructions that, when executed by the processor, cause the processor to perform operations comprising:
      receiving sensor data representing a first object in an environment;
      generating, based on the sensor data, a first state vector that represents physical properties of the first object;
      generating, for each respective object of a plurality of objects previously observed in the environment, a corresponding metric indicating a likelihood that the first object is the same as the respective object, wherein the corresponding metric is generated by a first machine learning (ML) model and based on (i) the first state vector and (ii) a respective state vector that represents physical properties of the respective object;
      determining, based on the corresponding metric of each respective object of the plurality of objects, that the first object is different from each respective object of the plurality of objects; and
      based on determining that the first object is different from each respective object of the plurality of objects, initializing a second ML model configured to represent the physical properties of the first object over time, wherein the second ML model is initialized based on the first state vector.

16. The system of claim 15, wherein determining that the first object is different from each respective object of the plurality of objects comprises:
   determining that the corresponding metric of each respective object of the plurality of objects does not exceed a threshold value; and
   based on determining that the corresponding metric of each respective object of the plurality of objects does not exceed a threshold value, determining that the first object is different from each respective object of the plurality of objects.

17. The system of claim 15, wherein the plurality of objects previously observed in the environment comprises n objects associated with corresponding n state vectors that are nearest to the first state vector.

18. The system of claim 15, further comprising:
   receiving additional sensor data representing a second object in the environment;
   generating, based on the additional sensor data, a second state vector that represents physical properties of the second object;
   generating, by the first ML model and based on (i) the first state vector and (ii) the second state vector, an additional metric indicating a likelihood that the first object is the same as the second object;
   determining, based on the additional metric, to update the first state vector; and
   updating the first state vector by the second ML model based on the second state vector.

19. The system of claim 15, wherein the second ML model comprises a long short-term memory neural network.

20. A non-transitory computer readable storage medium having stored thereon instructions that, when executed by a computing device, cause the computing device to perform operations comprising:
   receiving sensor data representing a first object in an environment;
   generating, based on the sensor data, a first state vector that represents physical properties of the first object;

generating, for each respective object of a plurality of objects previously observed in the environment, a corresponding metric indicating a likelihood that the first object is the same as the respective object, wherein the corresponding metric is generated by a first machine learning (ML) model and based on (i) the first state vector and (ii) a respective state vector that represents physical properties of the respective object;

determining, based on the corresponding metric of each respective object of the plurality of objects, that the first object is different from each respective object of the plurality of objects; and based on determining that the first object is different from each respective object of the plurality of objects, initializing a second ML model configured to represent the physical properties of the first object over time, wherein the second ML model is initialized based on the first state vector.

* * * * *